Patented May 23, 1933

1,910,693

UNITED STATES PATENT OFFICE

IVAN GUBELMANN AND JOHN M. TINKER, OF SOUTH MILWAUKEE, WISCONSIN, ASSIGNORS TO E. I. DU PONT DE NEMOURS & COMPANY, OF WILMINGTON, DELAWARE, A CORPORATION OF DELAWARE

PROCESS FOR PREPARING ANTHRAQUINONE DERIVATIVES

No Drawing. Application filed July 2, 1932. Serial No. 620,726.

This application is a continuation in part of our earlier application, Ser. No. 461,043, filed June 13, 1930.

The invention herein described relates to a process for preparing anthraquinone derivatives. More particularly, it deals with an improved process for preparing beta-diamino-anthraquinone compounds, such as 2,6-diamino-anthraquinone and 2,7-diamino-anthraquinone, by reacting with ammonia upon the corresponding beta-disulfonic acids of anthraquinone in the presence of an oxidizing agent.

In our copending application Ser. No. 461,043, we disclosed an improved process for preparing beta-amino-anthraquinone, which consisted in reacting with aqueous ammonia under pressure upon beta-anthraquinone-sulfonic acid, while gradually feeding in an oxidizing agent into the reaction mixture at a rate not substantially higher than the rate of formation of sulfurous acid. We had found that such gradual addition of the oxidizing agent results in a considerably higher yield and a substantially purer product of beta-amino-anthraquinone, as compared with the old processes wherein the oxidizing agents were added at the beginning of the reaction in full quantity required for complete reaction.

We have now found that the said invention is of much wider scope and applies with remarkably improved results to the manufacture of beta-diamino-anthraquinones, such as 2,6-diamino-anthraquinone or 2,7-diamino-anthraquinone, from the corresponding beta-anthraquinone-disulfonic acids.

It is accordingly an object of this invention to improve the process of manufacturing 2,6- and 2,7-diamino-anthraquinones from the corresponding disulfonic acids, whereby to increase the yield obtained and the purity of the product.

Other and further important objects of this invention will appear as the description proceeds.

According to our invention, we charge 2,6- or 2,7-anthraquinone-disulfonic acid, or a water-soluble salt thereof, and an excess of aqueous ammonia into an autoclave, close the vessel, and heat the entire mass to the reaction temperature, which is generally around 125° to 210° C. We then begin feeding in an oxidizing agent, for instance, an aqueous solution of an alkali-metal chlorate, at a rate comparable to the rate of reaction, and continue such gradual feeding until substantially near the end of the reaction. Thereupon the final quantity of oxidizing agent theoretically calculated is added, and the mass is maintained at elevated temperature for some time to complete the reaction. Another way of expressing our invention is to say that we add the oxidizing agent at a rate not substantially higher than the rate of formation of sulfurous acid. The rate of reaction varies with the temperature and pressure. At the higher temperatures the amination may be completed in 20 to 30 hours. The lower temperatures may require as long a treatment period as 60 hours. We, therefore, regulate the supply of oxidizing agent so that just about the theoretically requisite quantity (two equivalents per mol of beta-anthraquinone-disulfonic acid) is fed in during the reaction period. For best results, the oxidizing agent should be fed in at such a rate that a sample of the reaction mixture at any stage except at the very end should contain either some leuco derivatives of anthraquinone or a small amount of oxidizing agent, but at no stage should it contain reduction derivatives lower than leuco or any large concentration of the oxidizing agent.

Without limiting this invention to any special theory for our discovery, we wish to state that in our opinion the general reaction illustrated in the present application as well as in copending application Ser. No. 461,043 proceeds in such a manner that at first a small portion of the beta-sulfonic acid is converted into the amine, splitting off a corresponding quantity of sulfurous acid. The latter is immediately neutralized by the excess ammonia, and acts on another portion of the beta-anthraquinone sulfonic acid, or perhaps also on the beta-amino-anthraquinone formed, reducing the same to the leuco compound, while being oxidized itself to the sulfate form. The sulfite ion concentration is thus reduced, and permits a further quantity of the beta-sulfonic acid to be converted into the amine. If the oxidizing agent is not added fast enough, the accumulative reducing effect of the sulfite may become so great as to reduce part of the anthraquinone compound to a deeper reduction stage than the leuco. In this form the anthraquinone body would not be readily convertible into beta-amino-anthraquinone, and would therefore constitute a loss of reactant, and a corresponding reduction of the yield. Furthermore, the presence of these anthraquinone reduction products, whether bearing an $SO_3H$ group or an $NH_2$ group, in the net product would contaminate the beta-amino-anthraquinone. On the other hand, if the oxidizing agent is added so fast that it oxidizes all the leuco-reduction products as fast as they are formed, there will be present in the mixture an excess of oxidizing agent which may act on the beta-sulfo-anthraquinone producing therefrom organic compounds which ultimately contaminate the desired major product.

For the purpose of facilitating feeding the oxidizing agent into the high pressure autoclave, we prefer to use the same in the form of a solution or suspension in a liquid. For the further purpose of facilitating the separation of the final product from the oxidizing agent, we prefer to use a water soluble oxidizing agent, for instance, sodium, potassium or ammonium chlorate or bromate. Nitrobenzene, its sulfonic acids or their salts may also be added if desired or expedient, as the disadvantages arising from the use of these substances in heretofore known processes are overcome in this process because of the fact that a high concentration of these compounds is never present in the reaction mixture.

The following example in which parts by weight are given will serve more fully to illustrate our invention.

*Example*

1240 parts of the ammonium salt of anthraquinone-2,6-disulfonic acid are charged into an autoclave containing 8500 parts of aqueous ammonia of 28% strength. The autoclave is closed and heated to 125° C., at which temperature reaction appears to set in. The temperature is then further raised to 170° C. within a period of about 3 hours. During this period 600 parts of a solution prepared from 495 parts of sodium chlorate and 1935 parts of 28% ammonia is gradually and uniformly fed in. The temperature of the mass is then maintained at 170–173° C., while the remaining 1830 parts of said solution are added over a period of about 8 hours. The pressure during this period is about 600 pounds per square inch, and the major part of the reaction probably takes place during this period. The mass is then stirred further at 170–173° C. for about 39 hours. The pressure is then released; the mass is diluted with an equal volume of water, and boiled to recover ammonia. The hot suspension is filtered, washed with water and dried. The product is a reddish brown powder corresponding in nitrogen content to 2,6-diamino-anthraquinone. The yield is exceptionally high, exceeding any yield obtainable by heretofore practiced methods.

The preparation of 2,7-diamino-anthraquinone from the ammonium salt of 2,7-anthraquinone-disulfonic acid, may be carried out in analogous manner, except that here the preferred temperature range during the major period of the reaction is 175–180° C. The yield is very good.

It will, of course, be understood that this process may be varied within wide limits without departing from the spirit of our invention. Thus, the temperature of the major portion of the reaction may range anywhere from 160 to 210° C., and this range may be approached slowly, as in the above example, or rapidly as desired. Further, the concentration of the ammonia may be varied from 10 to 35%, using correspondingly lower or higher pressures. Similarly, the quantity of oxidizing agent may be varied within certain limits; for instance, 1.75 to 5.00 equivalents of the oxidizing agent per mol of the anthraquinone compound may be employed. In the case of an excess, however, the best results will not be obtained unless care is taken to prevent the excess from being present in the mixture until most of the beta-anthraquinone-disulfonic acid has been converted over into the amino compound. Again, the duration of the heating may vary from 20 hours or less to 60 hours or more. The addition of the oxidizing agent, moreover, may be extended over the entire reaction period or only over a major portion thereof. Nor is it essential that any of the oxidizing agent be added during the heating-up stage at all. As pointed out, however, better results are obtained if the addition of said oxidizing agent is distributed over a long period.

Instead of the ammonium salt of anthraquinone-beta-disulfonic acid, other water-soluble salts of the same may be used, as well as the free acid. It is advantageous, however, to employ either the free acid, or such salts as the sodium, potassium, or ammonium, which do not form insoluble sulfates, chlorides, or hydroxides; the advantage being that the resultant beta-diamino-anthraquinone is obtained free of inorganic impurities.

In the claims below, the term "a beta-anthraquinone-disulfonic acid compound", should be understood to refer to beta-anthraquinone-disulfonic acid or its water-soluble salts; the term "alkali-metal salt" should be understood as comprising the sodium, potassium or ammonium salts.

We claim:

1. In the process of preparing a beta-diamino-anthraquinone by reacting upon the corresponding beta-disulfo-anthraquinone with ammonia and an oxidizing agent, the step which comprises feeding the oxidizing agent into the reaction mass gradually, after the temperature-pressure conditions for reaction have been established, and at a rate commensurate with the rate of reaction.

2. In the process of preparing a beta-diamino-anthraquinone by reacting upon a beta-anthraquinone-disulfonic acid compound with ammonia, the steps which comprise first bringing a mixture of these reactants to the reaction temperature and pressure and then adding an oxidizing agent thereto.

3. In the process of preparing a beta-diamino-anthraquinone by reacting upon a beta-anthraquinone-disulfonic acid compound with aqueous ammonia, the step which comprises adding an oxidizing agent to the reaction mixture while the same is under reactive conditions at a rate insufficient to prevent the formation within the mixture of anthraquinone leuco compounds but sufficient to prevent the formation of reduction products lower than the leuco during the major portion of the reaction period.

4. In the process of preparing a beta-diamino-anthraquinone by reacting upon a beta-anthraquinone-disulfonic acid compound with aqueous ammonia, the step which comprises adding an oxidizing agent to the reaction mixture at a rate not substantially higher than the rate of formation of sulfurous acid compounds therein.

5. The process of preparing a diamino-anthraquinone compound which comprises heating a mixture of a compound selected from the group consisting of 2,6-anthraquinone-disulfonic acid, 2,7-anthraquinone-disulfonic acid, and salts thereof, with aqueous ammonia under pressure to a temperature sufficient to initiate the reaction, adding a small quantity of an oxidizing agent, and continuing the heating and gradual feeding in of an oxidizing agent until substantial completion of the reaction.

6. The process of preparing a diamino-anthraquinone compound which comprises heating a mixture of a compound selected from the group consisting of 2,6-anthraquinone-disulfonic acid, 2,7-anthraquinone-disulfonic acid, and salts thereof, with aqueous ammonia under pressure to a temperature sufficient to initiate the reaction, adding a small quantity of a water-soluble oxidizing agent, and continuing the heating and gradual feeding in of the oxidizing agent until substantial completion of the reaction.

7. The process of preparing 2,6-diamino-anthraquinone which comprises heating a mixture of 2,6-anthraquinone disulfonic acid compound with aqueous ammonia under pressure to a temperature sufficient to initiate the reaction, then feeding in into the reaction mass an aqueous solution of an alkali-metal chlorate, continuing the heating to maintain the reaction until substantially completed, and continuing the feeding in of the chlorate solution at a rate not substantially exceeding the rate of reaction between the anthraquinone body and ammonia.

8. In the process of preparing 2,6-diamino-anthraquinone by reacting upon 2,6-disulfo-anthraquinone with ammonia and an oxidizing agent, the step which comprises feeding the oxidizing agent into the reaction mass gradually, after the temperature-pressure conditions for reaction have been established, and at a rate commensurate with the rate of reaction.

9. In the process of preparing 2,6-diamino-anthraquinone by reacting upon 2,6-disulfo-anthraquinone with ammonia, the steps which comprise first bringing a mixture of these reactants to the reaction temperature and pressure and then adding an oxidizing agent thereto.

10. In the process of preparing 2,6-diamino-anthraquinone by reacting upon 2,6-disulfo-anthraquinone with aqueous ammonia, the step which comprises adding an oxidizing agent to the reaction mixture while the same is under reactive conditions at a rate insufficient to prevent the formation within the mixture of anthraquinone leuco compounds but sufficient to prevent the formation of reduction products lower than the leuco during the major portion of the reaction period.

11. In the process of preparing 2,6-diamino-anthraquinone by reacting upon 2,6-disulfo-anthraquinone with aqueous ammonia, the step which comprises adding an oxidizing agent to the reaction mixture at a rate not substantially higher than the rate of formation of sulfurous acid compounds therein.

12. In the process of preparing 2,7-diamino-anthraquinone by reacting upon 2,7-disulfo-anthraquinone with ammonia and an oxidizing agent, the step which comprises feeding the oxidizing agent into the reaction mass gradually, after the temperature-pressure conditions for reaction have been established, and at a rate commensurate with the rate of reaction.

13. In the process of preparing 2,7-diamino-anthraquinone by reacting upon 2,7-disulfo-anthraquinone with ammonia, the steps which comprise first bringing a mixture of these reactants to the reaction temperature and pressure and then adding an oxidizing agent thereto.

14. In the process of preparing 2,7-diamino-anthraquinone by reacting upon 2,7-disulfo-anthraquinone with aqueous ammonia, the step which comprises adding an oxidizing agent to the reaction mixture while the same is under reactive conditions at a rate insufficient to prevent the formation within the mixture of anthraquinone leuco compounds but sufficient to prevent the formation of reduction products lower than the leuco during the major portion of the reaction period.

15. In the process of preparing 2,7-diamino-anthraquinone by reacting upon 2,7-disulfo-anthraquinone with aqueous ammonia, the step which comprises adding an oxidizing agent to the reaction mixture at a rate not substantially higher than the rate of formation of sulfurous acid compounds therein.

16. In the process of preparing a beta-amino-anthraquinone by reacting upon the corresponding beta-sulfo-anthraquinone with ammonia and an oxidizing agent, the step which comprises feeding the oxidizing agent into the reaction mass gradually, after the temperature-pressure conditions for reaction have been established, and at a rate commensurate with the rate of reaction.

17. In the process of preparing a beta-amino-anthraquinone by reacting upon a beta-anthraquinone-sulfonic acid compound with ammonia, the steps which comprise first bringing a mixture of these reactants to the reaction temperature and pressure and then adding an oxidizing agent thereto.

18. In the process of preparing a beta-amino-anthraquinone by reacting upon a beta-anthraquinone-sulfonic acid compound with aqueous ammonia, the step which comprises adding an oxidizing agent to the reaction mixture while the same is under reactive conditions at a rate insufficient to prevent the formation within the mixture of anthraquinone leuco compounds but sufficient to prevent the formation of reduction products lower than the leuco during the major portion of the reaction period.

19. In the process of preparing a beta-amino-anthraquinone by reacting upon a beta-anthraquinone-sulfonic acid compound with aqueous ammonia, the step which comprises adding an oxidizing agent to the reaction mixture at a rate not substantially higher than the rate of formation of sulfurous acid compounds therein.

In testimony whereof we affix our signatures.

IVAN GUBELMANN.
JOHN M. TINKER.